United States Patent
McCarthy et al.

(10) Patent No.: US 12,551,029 B1
(45) Date of Patent: Feb. 17, 2026

(54) CHILD SEAT ATTACHMENT FOR LUGGAGE

(71) Applicants: John McCarthy, Conyers, GA (US); Josephine McCarthy, Conyers, GA (US)

(72) Inventors: John McCarthy, Conyers, GA (US); Josephine McCarthy, Conyers, GA (US)

( * ) Notice: Subject to any disclaimer, the term of this patent is extended or adjusted under 35 U.S.C. 154(b) by 165 days.

(21) Appl. No.: 18/630,038

(22) Filed: Apr. 9, 2024

(51) Int. Cl.
*A47D 1/10* (2006.01)
*A47D 15/00* (2006.01)

(52) U.S. Cl.
CPC .............. *A47D 1/10* (2013.01); *A47D 15/006* (2013.01)

(58) Field of Classification Search
CPC ........ A47D 1/10; A47D 15/006; A47C 31/00; A47C 4/52
See application file for complete search history.

(56) References Cited

U.S. PATENT DOCUMENTS

| | | | | |
|---|---|---|---|---|
| 5,695,246 | A * | 12/1997 | Tsai | B62B 5/085 |
| | | | | 297/335 |
| 6,241,313 | B1 * | 6/2001 | Lenz | A47D 1/10 |
| | | | | 297/188.2 |
| D459,883 | S * | 7/2002 | Worrell | A45C 9/00 |
| | | | | D3/274 |
| 6,471,019 | B1 * | 10/2002 | Miller | A45C 15/00 |
| | | | | 190/111 |
| 6,932,427 | B2 * | 8/2005 | Tamura | A47C 4/52 |
| | | | | 297/14 |
| 7,213,692 | B2 * | 5/2007 | Wang | A45C 9/00 |
| | | | | 297/188.13 |
| 8,182,030 | B1 * | 5/2012 | Britten | A45C 9/00 |
| | | | | 297/118 |
| 9,596,939 | B1 * | 3/2017 | Helman | A45F 4/02 |
| 9,808,097 | B2 * | 11/2017 | Whitt | A47C 7/425 |
| 10,820,682 | B2 * | 11/2020 | Jones | A45F 3/04 |
| 11,045,014 | B2 * | 6/2021 | Wang | A47D 13/027 |
| 2004/0021353 | A1 * | 2/2004 | Lozano | A47D 1/10 |
| | | | | 297/255 |
| 2004/0251717 | A1 * | 12/2004 | Tamura | B62B 5/085 |
| | | | | 297/17 |
| 2009/0289480 | A1 | 11/2009 | McFarland | |
| 2012/0161408 | A1 | 6/2012 | Sidhu | |
| 2020/0305567 | A1 * | 10/2020 | Lo | A45C 9/00 |
| 2023/0017030 | A1 * | 1/2023 | Rieu | A47D 1/10 |

FOREIGN PATENT DOCUMENTS

WO 2021116552 6/2021

* cited by examiner

*Primary Examiner* — Justin M Benedik
(74) *Attorney, Agent, or Firm* — Kyle A. Fletcher, Esq.

(57) ABSTRACT

The child seat attachment for luggage includes a child seat, a pair of telescopic legs, a safety harness, a headrest, and one or more mesh cup holders. The child seat may detachably couple to wheeled luggage. The child seat may be adapted for a toddler to sit upon while the wheeled luggage is pulled by an adult. The child seat may be held in place on the wheeled luggage by a mounting clamp and a plurality of securement straps. The pair of telescopic legs may be deployed under the front of the child seat to stabilize the combination of the child seat and the wheeled luggage. The child seat may fold for storage.

20 Claims, 9 Drawing Sheets

CHILD SEAT ATTACHMENT FOR LUGGAGE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of child seats and luggage accessories, more specifically, a child seat attachment for luggage.

SUMMARY OF INVENTION

The child seat attachment for luggage comprises a child seat, a pair of telescopic legs, a safety harness, a headrest, and one or more mesh cup holders. The child seat may detachably couple to wheeled luggage. The child seat may be adapted for a toddler to sit upon while the wheeled luggage is pulled by an adult. The child seat may be held in place on the wheeled luggage by a mounting clamp and a plurality of securement straps. The pair of telescopic legs may be deployed under the front of the child seat to stabilize the combination of the child seat and the wheeled luggage. The child seat may fold for storage.

An object of the invention is to provide a child seat that may detachably couple to wheeled luggage.

Another object of the invention is to provide a mounting clamp and a plurality of securement straps to couple the child seat to the wheeled luggage.

A further object of the invention is to provide a pair of telescopic legs hingedly coupled to the bottom of the child seat and deployable to stabilize the wheeled luggage and child seat.

Yet another object of the invention is to provide a safety harness to retain a toddler in the child seat, a headrest to support the toddler's head, and one or more mesh cup holders to retain one or more drinking cups.

These together with additional objects, features and advantages of the child seat attachment for luggage will be readily apparent to those of ordinary skill in the art upon reading the following detailed description of the presently preferred, but nonetheless illustrative, embodiments when taken in conjunction with the accompanying drawings.

In this respect, before explaining the current embodiments of the child seat attachment for luggage in detail, it is to be understood that the child seat attachment for luggage is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the child seat attachment for luggage.

It is therefore important that the claims be regarded as including such equivalent construction insofar as they do not depart from the spirit and scope of the child seat attachment for luggage. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
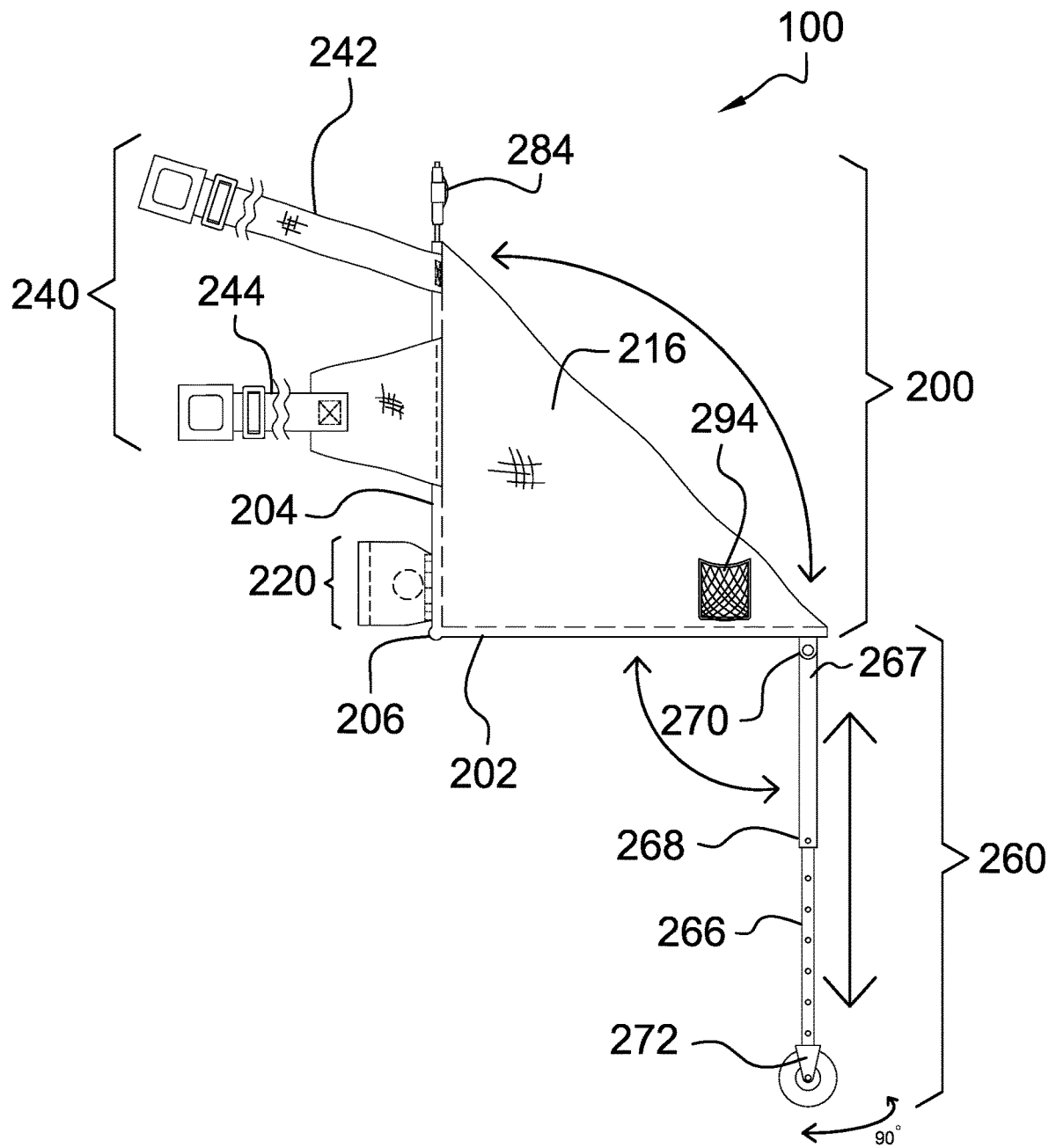
FIG. 1 is a right side view of an embodiment of the disclosure, illustrating the telescopic legs unfolded for deployment.
Figure 2:
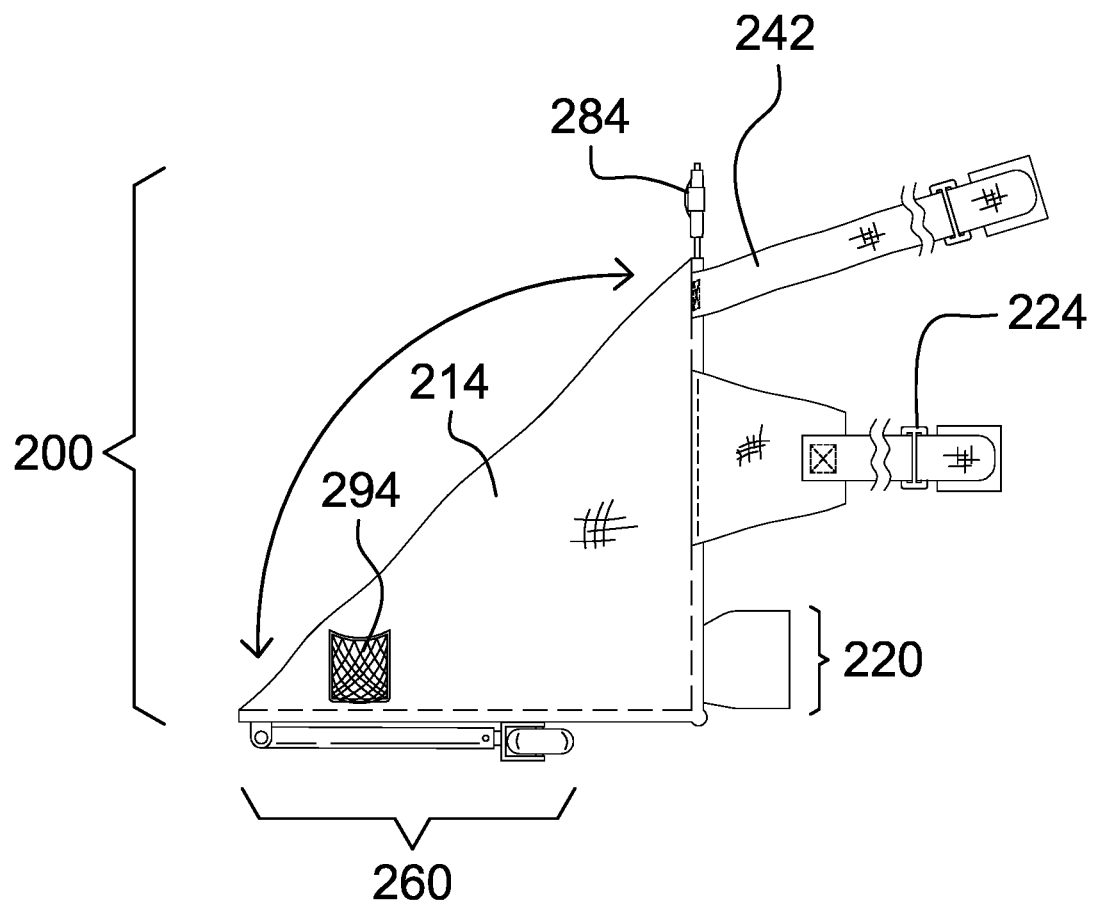
FIG. 2 is a left side view of an embodiment of the disclosure, illustrating the telescopic legs folded under the child seat.
Figure 3:
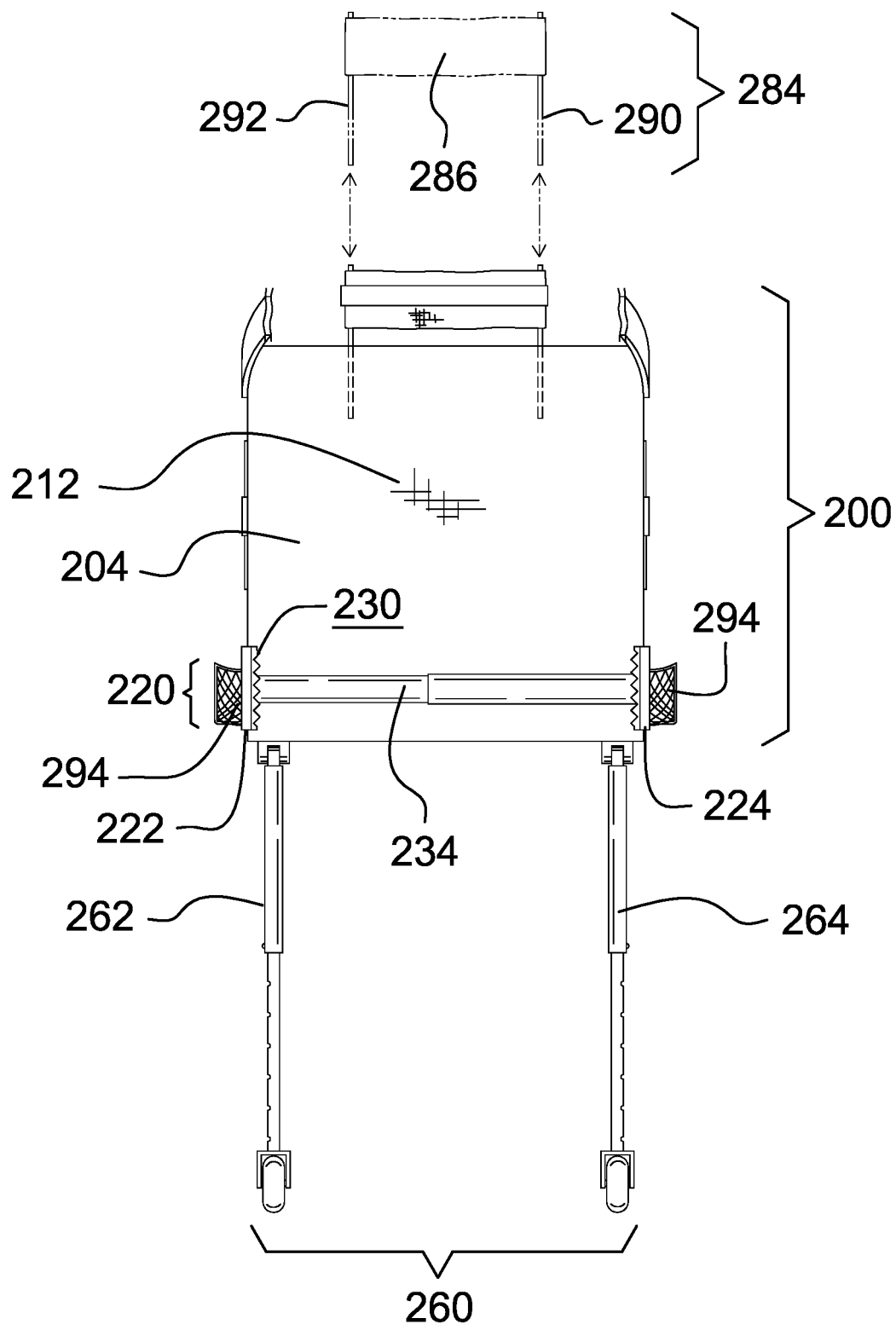
FIG. 3 is a rear view of an embodiment of the disclosure.
Figure 4:
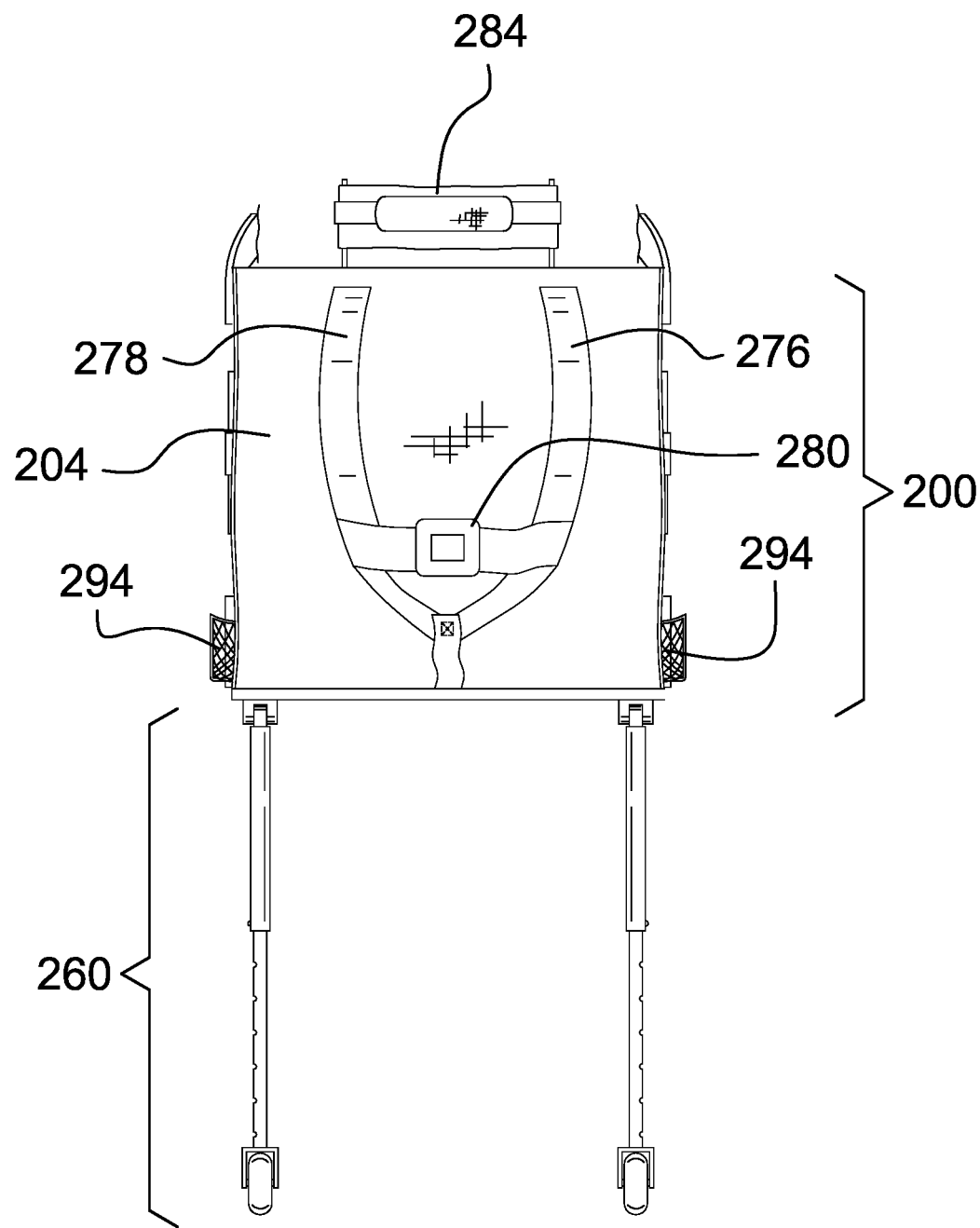
FIG. 4 is a front view of an embodiment of the disclosure.
Figure 5:
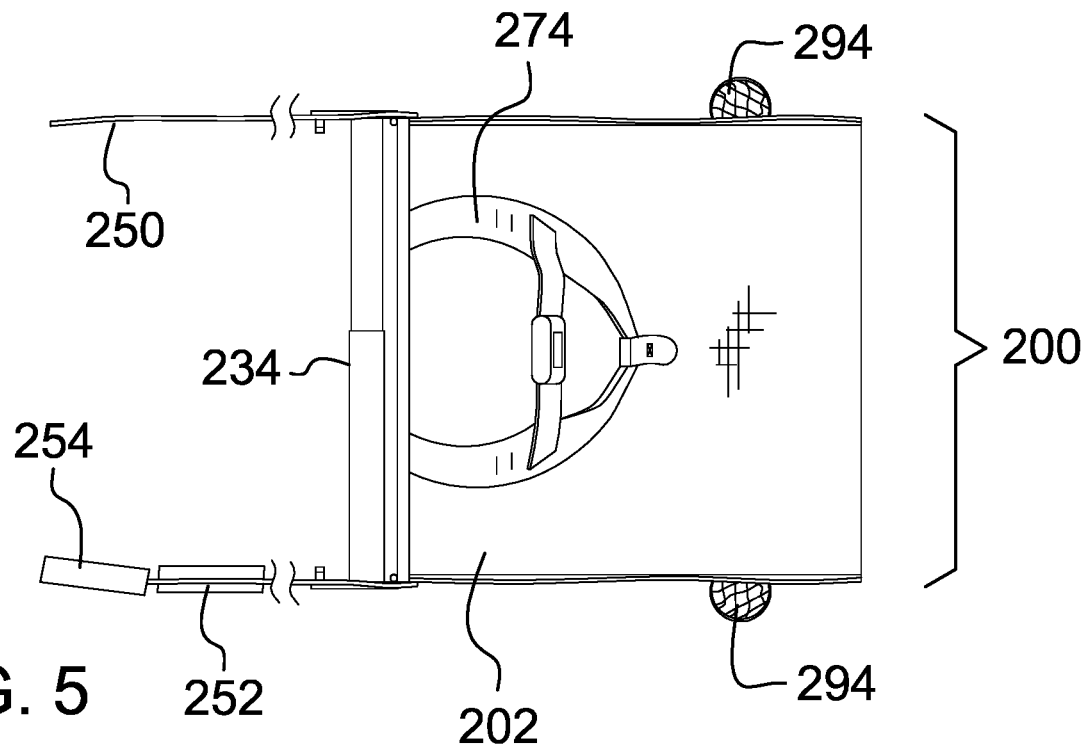
FIG. 5 is a top view of an embodiment of the disclosure.
Figure 6:
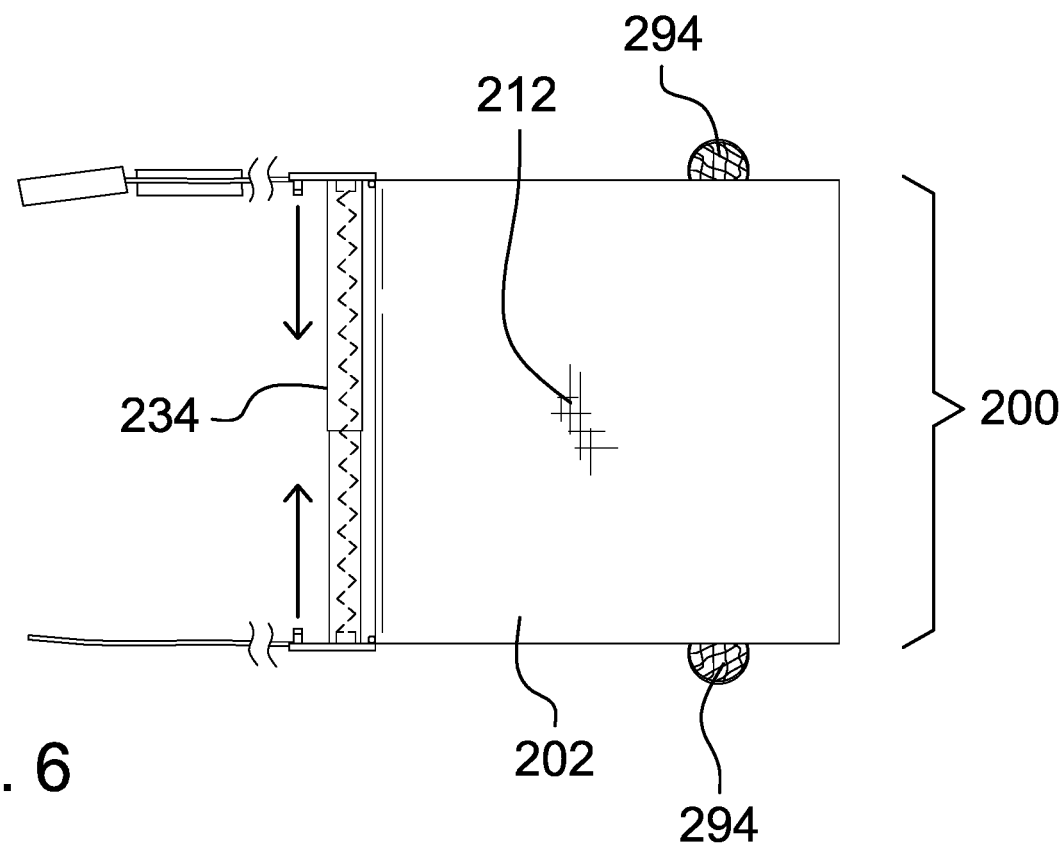
FIG. 6 is a bottom view of an embodiment of the disclosure.
Figure 7:
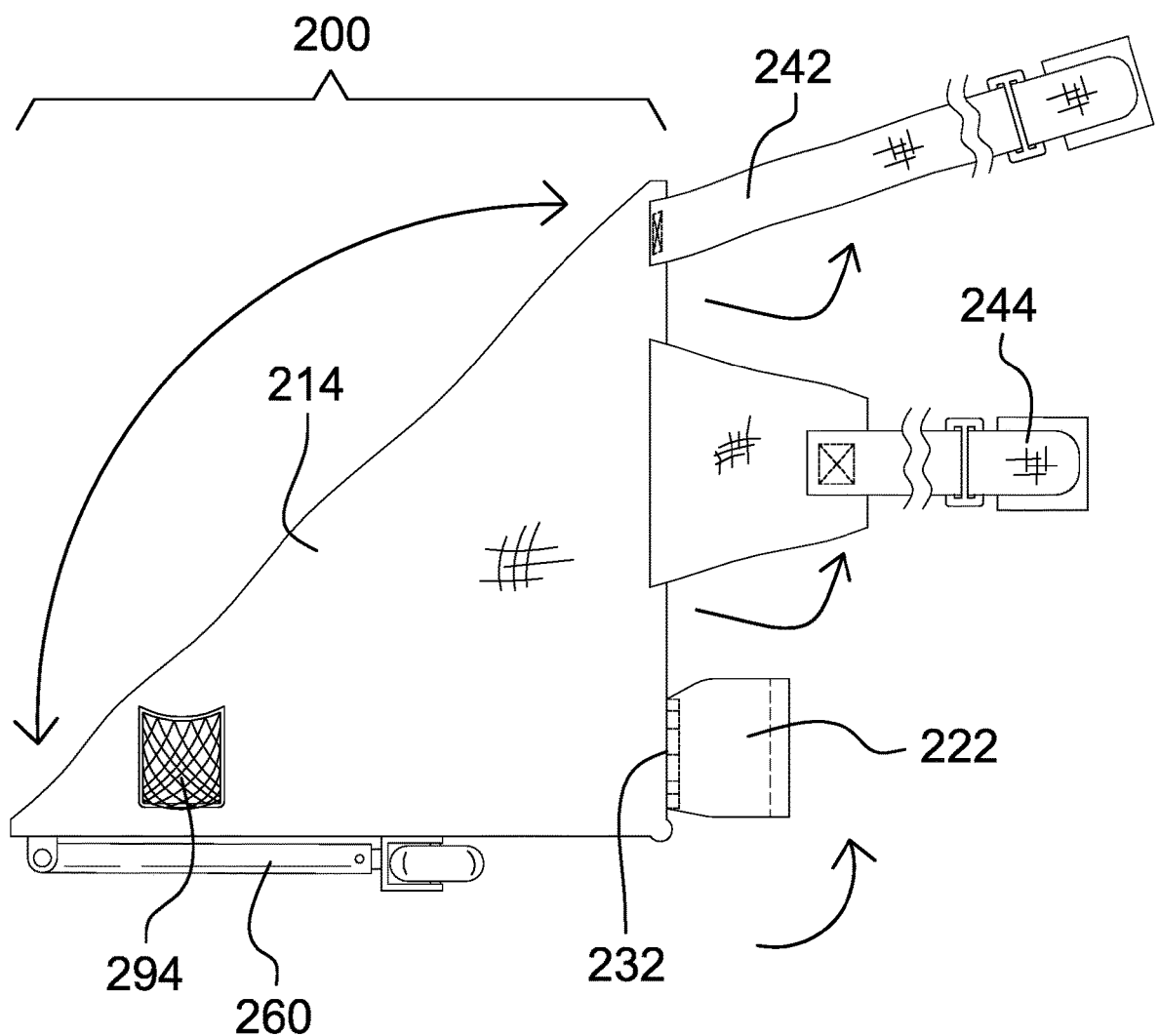
FIG. 7 is a left side view of an embodiment of the disclosure, illustrating steps in the storage of the invention-folding the left jaw after removing the spring-loaded tensioner, telescopic legs folded up, fold the child seat, and secure the plurality of securement straps.
Figure 8:
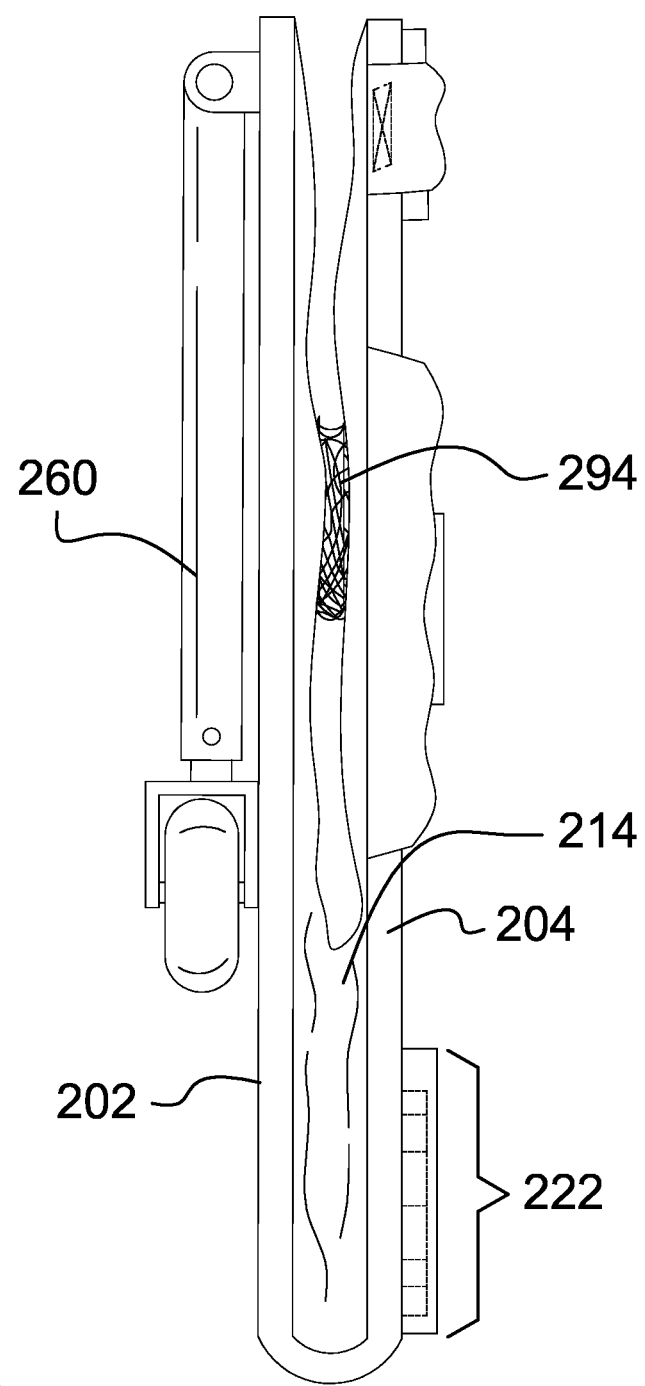
FIG. 8 is a detail view of an embodiment of the disclosure, illustrating the invention ready for storage.
Figure 9:
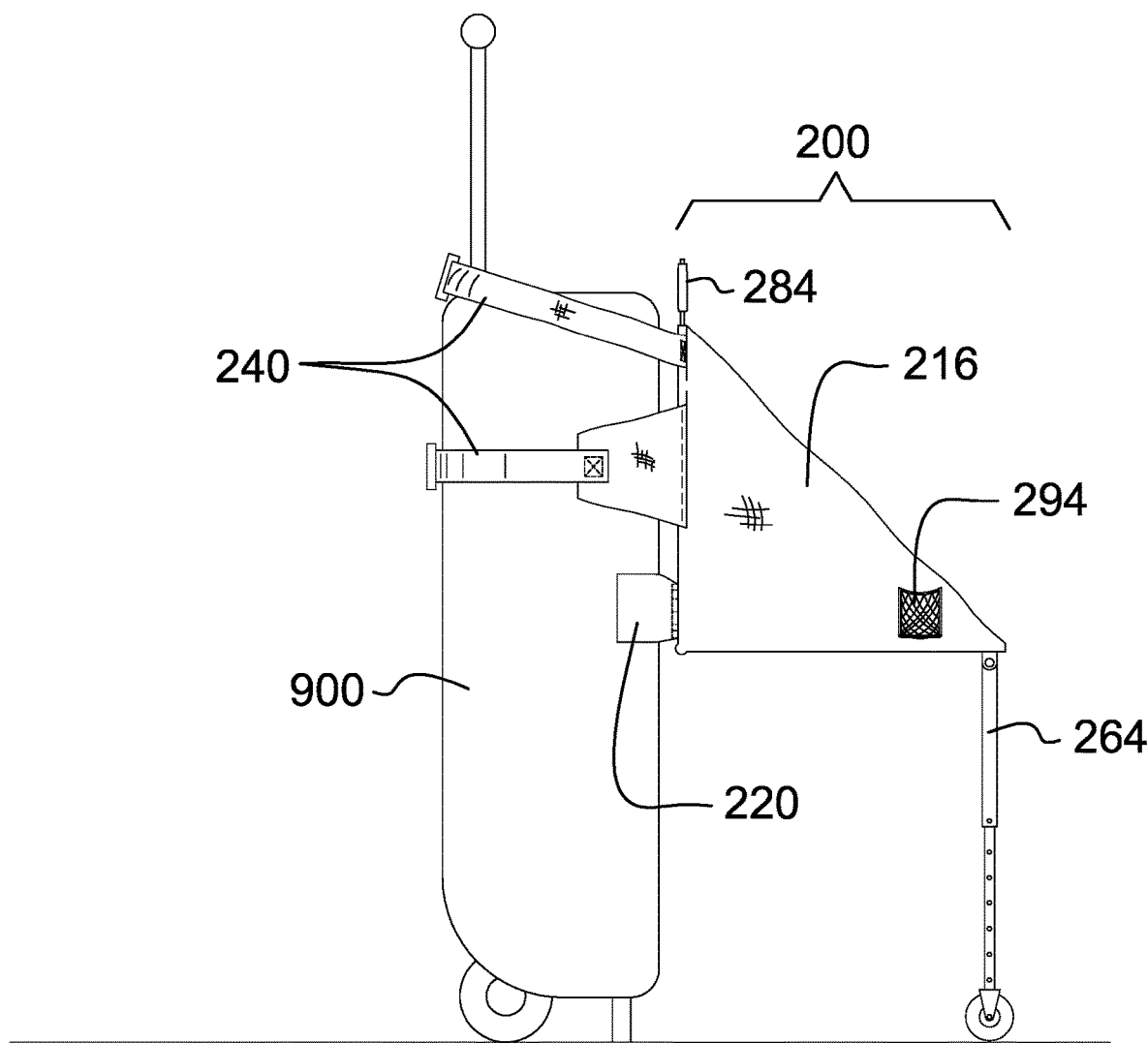
FIG. 9 is an in-use view of an embodiment of the disclosure, illustrating the telescopic legs deployed to stabilize the wheeled luggage and child seat.
Figure 10:
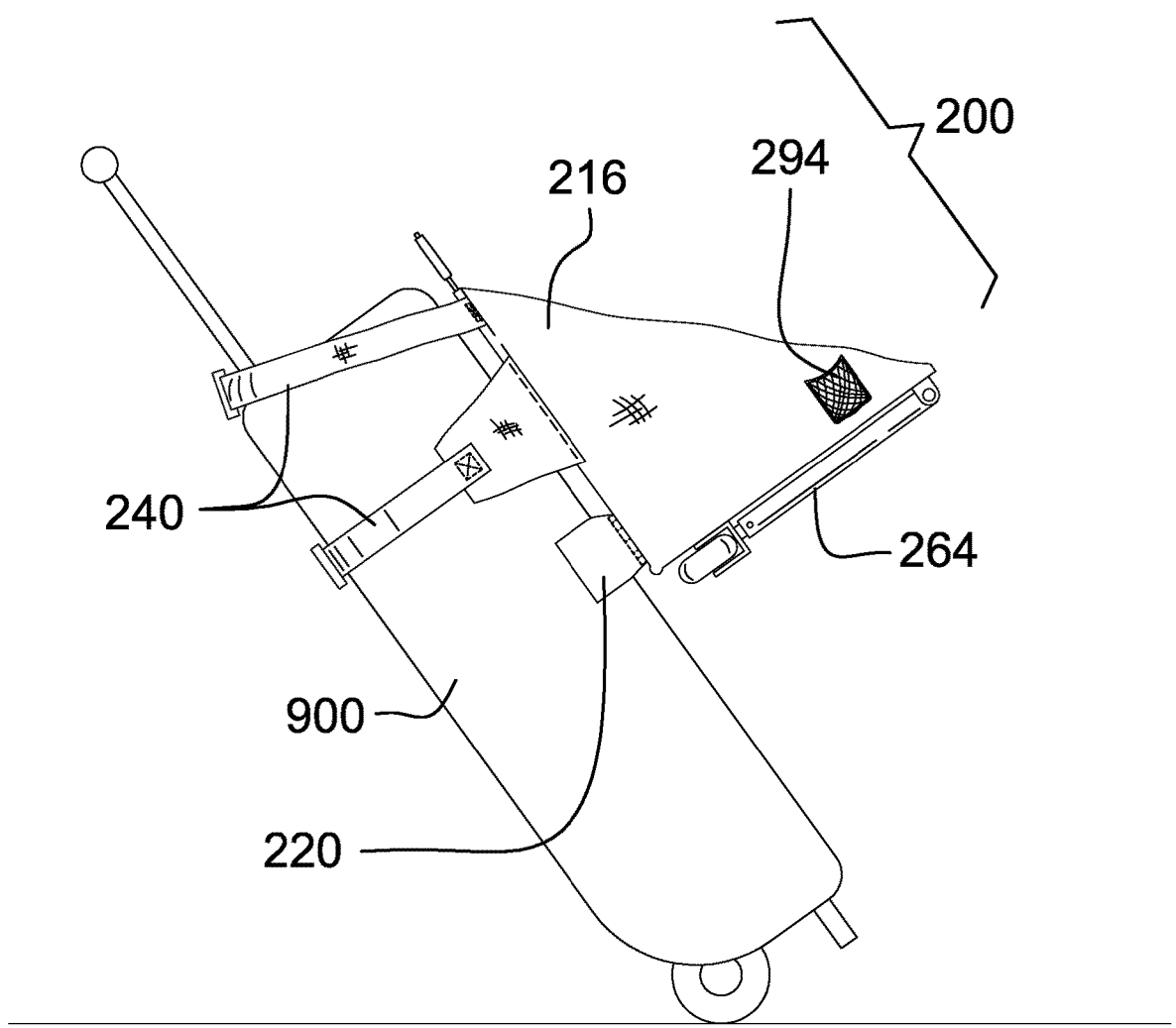
FIG. 10 is an in-use view of an embodiment of the disclosure, illustrating the telescopic legs folded up such that the wheeled luggage may be moved using only the wheels on the wheeled luggage.

Detailed reference will now be made to a first potential embodiment of the disclosure, which is illustrated in FIGS. 1 through 10.

The child seat attachment for luggage 100 (hereinafter invention) comprises a child seat 200, a pair of telescopic legs 260, a safety harness 274, a headrest 284, and one or more mesh cup holders 294. The child seat 200 may detachably couple to wheeled luggage 900. The child seat 200 may be adapted for a toddler to sit upon while the wheeled luggage 900 is pulled by an adult. The invention 100 may be held in place on the wheeled luggage 900 by a mounting clamp 220 and a plurality of securement straps 240. The pair of telescopic legs 260 may be deployed under the front of the child seat 200 to stabilize the combination of the child seat 200 and the wheeled luggage 900. The child seat 200 may fold for storage.

The child seat 200 may comprise a seat bottom 202 that may be hingedly coupled to a seat back 204 via a seat hinge 206. The seat bottom 202 may be a horizontally-oriented panel that may be adapted for the toddler to sit upon. The seat back 204 may be a vertically-oriented panel that may be adapted for the toddler to lean against. An individual seat panel selected from the horizontally-oriented panel and the vertically-oriented panel may comprise a rigid panel. As non-limiting examples, the rigid panel may be made from plyboard, plastic, fiberglass, or any combination thereof. The rigid panel may be covered by a nylon seat cover 212.

The child seat 200 may further comprise a left side panel 214 and a right side panel 216. The left side panel 214 and the right side panel 216 may be coupled to the seat bottom 202 and to the seat back 204 on the left and right sides of the child seat 200, respectively. The left side panel 214 and the right side panel 216 may constrain the maximum angle formed by an open child seat while allowing the child seat 200 to fold such that the seat bottom 202 may be brought adjacent to the seat back 204.

An individual side panel selected from the left side panel 214 and the right side panel 216 may be triangular in shape and may be flexible. The individual side panel may be made of fabric. As a non-limiting example, the individual side panel may be made of nylon.

The mounting clamp 220 may comprise a left jaw 222, a right jaw 224, and a spring-loaded tensioner 234. The mounting clamp 220 may be operable to detachably couple the child seat 200 to the wheeled luggage 900. The mounting clamp 220 may be coupled to the rear of the seat back 204 and may be oriented laterally across the child seat 200. The mounting clamp 220 may couple to the wheeled luggage 900 by gripping the wheeled luggage 900 between the left jaw 222 and the right jaw 224. The spring-loaded tensioner 234 may be operable to pull the left jaw 222 and the right jaw 224 together to tighten the grip on the wheeled luggage 900.

The left jaw 222 and the right jaw 224 may be hingedly coupled to opposing side of the seat back 204. An individual jaw selected from the left jaw 222 and the right jaw 224 comprise a plurality of grip teeth 230 to grip the wheeled luggage 900 and a jaw hinge 232 to hingedly couple the individual jaw to the spring-loaded tensioner 234. The plurality of grip teeth 230 may be oriented to point towards the wheeled luggage 900. The jaw hinge 232 may permit the individual jaw to pivot for storage.

The spring-loaded tensioner 234 may extend laterally across the rear of the seat back 204 and may force the left jaw 222 and the right jaw 224 to press against the wheeled luggage 900. The spring-loaded tensioner 234 may be removed for storage such that the left jaw 222 and the right jaw 224 may fold against the seat back 204. As a non-limiting example, the spring-loaded tensioner 234 may be a telescopic tube with an internal spring.

The plurality of securement straps 240 may comprise an upper securement strap 242 and a lower securement strap 244. The plurality of securement straps 240 may be coupled to the seat back 204. The plurality of securement straps 240 may be configured to wrap around the wheeled luggage 900 to retain the child seat 200 on the wheeled luggage 900. The upper securement strap 242 may be positioned at the top of the seat back 204. The lower securement strap 244 may be positioned between the upper securement strap 242 and the mounting clamp 220.

An individual securement strap selected from the upper securement strap 242 and the lower securement strap 244 may comprise a left strap portion 250, a right strap portion 252, and a strap fastener 254. The left strap portion 250 may be coupled to the left side of the seat back 204 and the right strap portion 252 may be coupled to the right side of the seat back 204. The left strap portion 250 and the right strap portion 252 may be detachably coupled using the strap fastener 254 to form a complete strap that may extend from the left side of the seat back 204 to the right side of the seat back 204 encompassing the wheeled luggage 900. The left strap portion 250 may be detached from the right strap portion 252 at the strap fastener 254 to remove the child seat 200 from the wheeled luggage 900. As a non-limiting example, the strap fastener 254 may be a buckle.

The pair of telescopic legs 260 may comprise a left telescopic leg 262 and a right telescopic leg 264. The left telescopic leg 262 may be hingedly coupled to the bottom of the front left corner of the seat bottom 202 and the right telescopic leg 264 may be hingedly coupled to the bottom of the front right corner of the seat bottom 202. The pair of telescopic legs 260 may be stored folded up into a horizontal orientation under the seat bottom 202. The pair of telescopic legs 260 may be deployed by unfolding the pair of telescopic legs 260 such that the pair of telescopic legs 260 are vertically oriented. The pair of telescopic legs 260 may lock into place during deployment and may be manually released to fold up.

An individual telescopic leg selected from the left telescopic leg 262 and the right telescopic leg 264 may comprise an upper leg segment 267, a lower leg segment 266, and a leg height adjuster 268. The length of the individual telescopic leg may be changed by sliding the lower leg segment 266 in and out of the upper leg segment 267. The leg height adjuster 268 may retain the length of the individual telescopic leg after adjustment. The individual telescopic leg may hingedly couple to the bottom of the seat bottom 202 via a leg hinge 270. The bottom of the individual telescopic leg may comprise a caster wheel 272 such that the individual telescopic leg may remain deployed while moving the wheeled luggage 900.

The safety harness 274 may be a restraint system adapted to retain the toddler in the child seat 200 during use. The safety harness 274 may comprise at least a left shoulder strap 276, a right shoulder strap 278 and a harness buckle 280. The left shoulder strap 276 may be coupled to the upper left side of the seat back 204 and to the harness buckle 280. The right shoulder strap 278 may be coupled to the upper right side of the seat back 204 and to the harness buckle 280. The left shoulder strap 276 and the right shoulder strap 278 may be adapted to pass over a toddler's shoulders and the harness buckle 280 may detachably couple to the center of the seat bottom 202, either directly or indirectly.

The headrest 284 may be adapted to support a toddler's head. The headrest 284 may comprise a headrest panel 286, a left support armature 290, and a right support armature 292. The headrest panel 286 may be a padded vertical panel.

The left support armature 290 and the right support armature 292 may be vertically-oriented armatures coupled to the bottom of the headrest panel 286. The left support armature 290 and the right support armature 292 may detachably couple the headrest 284 to the top of the seat back 204.

The one or more mesh cup holders 294 may be coupled to the outside of the left side panel 214, the outside of the right side panel 216, or both. The one or more mesh cup holders 294 may be configured to hold one or more drinking cups in an upright orientation. The one or more mesh cup holders 294 may be made of a mesh material such that moisture may drain from within the one or more mesh cup holders 294.

In use, the child seat 200 may be coupled to the wheeled luggage 900 by clamping the mounting clamp 220 onto the wheeled luggage 900 on the side of the wheeled luggage 900 that is opposite the handle and the wheels of the wheeled luggage 900 and by wrapping the plurality of securement straps 240 around the wheeled luggage 900. The mounting clamp 220 may be clamped to the wheeled luggage 900 by pulling the left jaw 222 and the right jaw 224 apart, sliding the mounting clamp 220 over the wheeled luggage 900, and releasing the left jaw 222 and the right jaw 224. The left jaw 222 and the right jaw 224 may be pressed against the wheeled luggage 900 by action of the spring-loaded tensioner 234. The lower securement strap 244 selected from the plurality of securement straps 240 may be wrapped around the wheeled luggage 900 by bring the left strap portion 250 and the right strap portion 252 of the lower securement strap 244 to the handle side of the wheeled luggage 900 and by coupling the left strap portion 250 and the right strap portion 252 using the strap fastener 254. The upper securement strap 242 selected from the plurality of securement straps 240 may be wrapped around the wheeled luggage 900 by bring the left strap portion 250 and the right strap portion 252 of the upper securement strap 242 to the handle side of the wheeled luggage 900 and by coupling the left strap portion 250 and the right strap portion 252 using the strap fastener 254.

The pair of telescopic legs 260 may be deployed by folding the pair of telescopic legs 260 down to a vertical orientation until the pair of telescopic legs 260 lock into place. The toddler may be seated in the child seat 200 and retained by the safety harness 274 as the wheeled luggage 900 is moved between venues.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, the word "buckle" may refer to any fastener that is used for joining a first loose end of a strap to a second loose end of the same strap or to a loose end of a different strap.

As used in this disclosure, a "caster" may be a housing that includes a wheel. A caster may be mounted to the bottom of a device to enable movement of the device with reduced friction. In some embodiments, a caster may comprise a swivel that allows the wheel to adjust, or swivel, the direction of rotation of the wheel to the direction of motion desired for the wheel.

As used herein, the words "couple", "couples", "coupled" or "coupling", may refer to connecting, either directly or indirectly, and does not necessarily imply a mechanical connection.

As used herein, "deploy" may refer to configuring a device to place the device into service or to make the device ready for service. As non-limiting examples, "deployed" may be synonymous with extended, unfolded, inflated, erected, or activated. As non-limiting examples, a device that is not deployed may be referred to as retracted, folded, deflated, withdrawn, collapsed, stowed, or deactivated.

As used in this disclosure, a "fastener" may be a device that is used to join or affix two objects. Fasteners May generally comprise a first element which is attached to the first object and a second element which is attached to the second object such that the first element and the second element join to affix the first object and the second object. Common fasteners may include, but are not limited to, hooks, zippers, snaps, clips, ties, buttons, buckles, quick release buckles, or hook and loop fasteners.

As used in this disclosure, "flexible" may refer to an object or material which will deform when a force is applied to it, which will not return to its original shape when the deforming force is removed, and which may not retain the deformed shape caused by the deforming force.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used herein, "handle" may refer to an object or aperture by which a tool, object, or door is held or manipulated with the hand.

As used in this disclosure, a "harness" may be an apparatus comprising a plurality of straps and one or more fasteners that is used to fasten or anchor a first person or first object to a second object. The phrase "N point harness" may refer to the installation of the harness wherein the harness has N anchor points. As a non-limiting example, a 2 point harness has two anchor points while a 5 point harness has 5 anchor points.

As used herein, the terms "height adjustment" or "height adjuster" may refer to a mechanism that allows the overall height of an armature or stanchion to change by releasing a locking mechanism, adjusting a position, and re-engaging the locking mechanism. As a non-limiting example, the locking mechanism may comprise a plurality of holes in a first armature and a spring loaded pin on a second armature where the pin passes through one of the holes when the pin and the hole align. As a further non-limiting example, the locking mechanism may comprise a spring-loaded button on an inside armature that pops through one of a plurality of holes in an outside armature and which can be pressed into the hole to release the locking mechanism.

As used in this disclosure, a "hinge" may be a device that permits the turning, rotating, or pivoting of a first object relative to a second object.

As used in this disclosure, "horizontal" may be a directional term that refers to a direction that is perpendicular to the local force of gravity. Unless specifically noted in this disclosure, the horizontal direction is always perpendicular to the vertical direction.

As used in this disclosure, the word "lateral" may refer to the sides of an object or movement towards a side. Lateral directions are generally perpendicular to longitudinal directions. "Laterally" may refer to movement in a lateral direction.

As used in this disclosure, "orientation" may refer to the positioning and/or angular alignment of a first object relative to a second object or relative to a reference position or reference direction.

As used herein, "plywood" and "plyboard" may refer to engineered wood products made by bonding wood sheets or wood strips. Plywood may be manufacturing by stacking multiple veneer sheets with the wood grain of adjacent sheets rotated 90 degrees and gluing the sheets under high pressure. Plyboard may be manufactured by gluing softwood strips edge to edge and by gluing hardwood and softwood veneers on both sides.

As used in this disclosure, a "spring" may be a device that is used to store mechanical energy. This mechanical energy will often be stored by deforming an elastomeric material that is used to make the device, by the application of a torque to a rigid structure, or by a combination thereof. In some embodiments, the rigid structure to which torque is applied may be composed of metal or plastic.

As used in this disclosure a "strap" may be a strip of leather, cloth, nylon, plastic, thin metal, rubber, or other flexible material, that is used to fasten, secure, carry, or hold onto something. A strap is sometimes used in conjunction with a buckle or other types of fasteners.

As used in this disclosure, "telescopic", "telescoping", and "telescopically" may refer to an object made of two or more sections that fit or slide into each other such that the object can be made longer or shorter by adjusting the relative positions of the sections.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 10, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A child seat attachment for luggage comprising:
a child seat, a pair of telescopic legs, a safety harness, a headrest, and one or more mesh cup holders;
wherein the child seat detachably couples to wheeled luggage;
wherein the child seat is adapted for a toddler to sit upon while the wheeled luggage is pulled by an adult;
wherein the child seat attachment for luggage is held in place on the wheeled luggage by a mounting clamp and a plurality of securement straps;
wherein the pair of telescopic legs is deployed under the front of the child seat to stabilize the combination of the child seat and the wheeled luggage;
wherein the child seat folds for storage.

2. The child seat attachment for luggage according to claim 1
wherein the child seat comprises a seat bottom that is hingedly coupled to a seat back via a seat hinge;
wherein the seat bottom is a horizontally-oriented panel that is adapted for the toddler to sit upon;
wherein the seat back is a vertically-oriented panel that is adapted for the toddler to lean against.

3. The child seat attachment for luggage according to claim 2
wherein an individual seat panel selected from the horizontally-oriented panel and the vertically-oriented panel comprises a rigid panel.

4. The child seat attachment for luggage according to claim 3
wherein the rigid panel is made from plyboard, plastic, fiberglass, or any combination thereof.

5. The child seat attachment for luggage according to claim 4
wherein the rigid panel is covered by a nylon seat cover.

6. The child seat attachment for luggage according to claim 3
wherein the child seat further comprises a left side panel and a right side panel;
wherein the left side panel and the right side panel are coupled to the seat bottom and to the seat back on the left and right sides of the child seat, respectively.

7. The child seat attachment for luggage according to claim 6
wherein the left side panel and the right side panel constrain the maximum angle formed by an open child seat while allowing the child seat to fold such that the seat bottom is brought adjacent to the seat back.

8. The child seat attachment for luggage according to claim 7
wherein an individual side panel selected from the left side panel and the right side panel is triangular in shape and flexible;
wherein the individual side panel is made of fabric.

9. The child seat attachment for luggage according to claim 8
wherein the individual side panel is made of nylon.

10. The child seat attachment for luggage according to claim 8
wherein the mounting clamp comprises a left jaw, a right jaw, and a spring-loaded tensioner;
wherein the mounting clamp is operable to detachably couple the child seat to the wheeled luggage;
wherein the mounting clamp is coupled to the rear of the seat back and is oriented laterally across the child seat;
wherein the mounting clamp couples to the wheeled luggage by gripping the wheeled luggage between the left jaw and the right jaw;
wherein the spring-loaded tensioner is operable to pull the left jaw and the right jaw together to tighten the grip on the wheeled luggage.

11. The child seat attachment for luggage according to claim 10
wherein the left jaw and the right jaw are hingedly coupled to opposing side of the seat back;
wherein an individual jaw selected from the left jaw and the right jaw comprise a plurality of grip teeth to grip the wheeled luggage and a jaw hinge to hingedly couple the individual jaw to the spring-loaded tensioner;

wherein the plurality of grip teeth are oriented to point towards the wheeled luggage;
wherein the jaw hinge permits the individual jaw to pivot for storage.

12. The child seat attachment for luggage according to claim 11
wherein the spring-loaded tensioner extends laterally across the rear of the seat back and forces the left jaw and the right jaw to press against the wheeled luggage;
wherein the spring-loaded tensioner is removed for storage such that the left jaw and the right jaw fold against the seat back.

13. The child seat attachment for luggage according to claim 12
wherein the spring-loaded tensioner is a telescopic tube with an internal spring.

14. The child seat attachment for luggage according to claim 12
wherein the plurality of securement straps comprises an upper securement strap and a lower securement strap;
wherein the plurality of securement straps are coupled to the seat back;
wherein the plurality of securement straps are configured to wrap around the wheeled luggage to retain the child seat on the wheeled luggage;
wherein the upper securement strap is positioned at the top of the seat back;
wherein the lower securement strap is positioned between the upper securement strap and the mounting clamp.

15. The child seat attachment for luggage according to claim 14
wherein an individual securement strap selected from the upper securement strap and the lower securement strap comprises a left strap portion, a right strap portion, and a strap fastener;
wherein the left strap portion is coupled to the left side of the seat back and the right strap portion is coupled to the right side of the seat back;
wherein the left strap portion and the right strap portion are detachably coupled using the strap fastener to form a complete strap that extends from the left side of the seat back to the right side of the seat back encompassing the wheeled luggage;
wherein the left strap portion is detached from the right strap portion at the strap fastener to remove the child seat from the wheeled luggage.

16. The child seat attachment for luggage according to claim 15,
wherein the pair of telescopic legs comprises a left telescopic leg and a right telescopic leg;
wherein the left telescopic leg is hingedly coupled to the bottom of the front left corner of the seat bottom and the right telescopic leg is hingedly coupled to the bottom of the front right corner of the seat bottom;
wherein the pair of telescopic legs are stored folded up into a horizontal orientation under the seat bottom;
wherein the pair of telescopic legs are deployed by unfolding the pair of telescopic legs such that the pair of telescopic legs are vertically oriented;
wherein the pair of telescopic legs lock into place during deployment and are manually released to fold up.

17. The child seat attachment for luggage according to claim 16
wherein an individual telescopic leg selected from the left telescopic leg and the right telescopic leg comprises an upper leg segment, a lower leg segment, and a leg height adjuster;
wherein the length of the individual telescopic leg is changed by sliding the lower leg segment in and out of the upper leg segment;
wherein the leg height adjuster retains the length of the individual telescopic leg after adjustment;
wherein the individual telescopic leg hingedly couples to the bottom of the seat bottom via a leg hinge;
wherein the bottom of the individual telescopic leg comprises a caster wheel.

18. The child seat attachment for luggage according to claim 17
wherein the safety harness is a restraint system adapted to retain the toddler in the child seat during use;
wherein the safety harness comprises at least a left shoulder strap, a right shoulder strap and a harness buckle;
wherein the left shoulder strap is coupled to the upper left side of the seat back and to the harness buckle;
wherein the right shoulder strap is coupled to the upper right side of the seat back and to the harness buckle;
wherein the left shoulder strap and the right shoulder strap are adapted to pass over a toddler's shoulders and the harness buckle detachably couples to the center of the seat bottom, either directly or indirectly.

19. The child seat attachment for luggage according to claim 18
wherein the headrest is adapted to support a toddler's head;
wherein the headrest comprises a headrest panel, a left support armature, and a right support armature;
wherein the headrest panel is a padded vertical panel;
wherein the left support armature and the right support armature are vertically-oriented armatures coupled to the bottom of the headrest panel;
wherein the left support armature and the right support armature detachably couple the headrest to the top of the seat back.

20. The child seat attachment for luggage according to claim 19
wherein the one or more mesh cup holders are coupled to the outside of the left side panel, the outside of the right side panel, or both;
wherein the one or more mesh cup holders are configured to hold one or more drinking cups in an upright orientation;
wherein the one or more mesh cup holders are made of a mesh material such that moisture drains from within the one or more mesh cup holders.

* * * * *